April 15, 1969     HANS-CARL ENDERLEIN     3,439,081
METHOD OF MOLDING A MATERIAL TO PREVENT PLUGGING
OF VENT HOLES IN THE DIE
Filed Jan. 13, 1966

INVENTOR.
HANS-CARL ENDERLEIN
BY
ATTORNEYS

3,439,081
METHOD OF MOLDING A MATERIAL TO PREVENT PLUGGING OF VENT HOLES IN THE DIE
Hans-Carl Enderlein, Essen, Germany, assignor to PAG Presswerk AG, Essen, Germany
Filed Jan. 13, 1966, Ser. No. 520,437
Int. Cl. D04b 1/20
U.S. Cl. 264—112           9 Claims

ABSTRACT OF THE DISCLOSURE

A method of preventing molding material of comminuted wood fiber and resin from expanding and clogging vent holes in a die by a two-step process. The first step is to form the molding material into a blank having recesses which will be aligned with the vent holes. The blank is formed in a first compression die which has projections which form the recesses. The blank is then placed in a second molding die which heats and compresses the blank. The recess in the blank align with the vent holes in the second die.

---

The present invention relates to the production of molded articles which are made of a molding material which is incapable of flowing or rising and are provided with a covering layer.

Such molding materials consist of a filler and a binding agent which is capable of hardening when heated. The filler of conventional molding materials consists, for example, of wood chips, saw dust, small cut-up pieces of textiles, paper, or straw, or of other chiplike, fibrous, pulverized, or small-grain materials. The binding agents which may harden under heat have the property that they do not harden at normal room temperature or that they harden so slowly that they may be stored for hours or even days so that molding materials which are mixed with such binding agents may be filled into a mold without hardening at this time. However, when the molding material is heated in the mold, the binding agent will harden within a very short time, for example, within a few minutes. The conventional molding materials are mixed, for example, with melamine resin, phenol resin, or other binding agents.

Molding materials which are capable of flowing or rising possess such a large content in binding agents that, after the heated binding agents have softened at the beginning of the molding process, the molding material is capable of flowing so that it is possible to produce, for example, hollow articles by pressing a die into the softened material, whereupon the material which is displaced at the bottom of the hollow article will rise around the die and form the walls of the hollow article. However, in the molding materials which are concerned in the present invention, that is, materials which are incapable of flowing or rising, the content in binding agents is so small that the material will also not become capable of flowing or rising and they are therefore commonly called "nonrisable" molding materials.

Since the molding material itself would usually provide the molded article with unattractive as well as a rough or porous outer surface which would easily permit the entry and accumulation of dirt, moisture, and the like, such articles are usually provided with an outer covering layer which is molded upon the article during its production. Such a covering layer is intended to attain a smooth and closed outer surface which may also be of any desired color, design, or grain appearance. Such covering layers which are also commonly called "overlays" or decorative layers consist, for example, of wood veneers which are saturated with melamine resin or phenol resin or any other synthetic resin, or of textile fabrics which are saturated with a synthetic resin, or of sheets of various other materials, especially paper, which are coated with a plastic. Thus, for example, such coated sheets of paper may be of a plain or any other color or a wood grain or any other design may be printed thereon.

Articles of nonrisable molding materials are generally produced in such a manner that the molding material is at first pressed in a preliminary mold so as to form a blank in which the binding agent is not as yet set. This blank is thereafter pressed in a final mold at an increased temperature at which the binding agent sets so as to form the final article. If these articles are to be provided with a covering layer, this layer is applied and molded thereon in the final mold.

By heating the molding material in the final mold, hot vapors or gases are formed which may be due, for example, to a moisture content of the molding material or may be freed from the binding agent. If these vapors or gases which are under pressure are enclosed in pores of the hardening molding material, they produce internal stresses in the finished article which may lead to cracks or even to a bursting of the finished articles when they are removed from the hold mold. This requires the hot vapors or gases to be discharged from the molding material during the molding process. This has been done by providing the molds with openings through which the vapors or gases may escape from the mold. These openings have also been used for the purpose of supplying heat to the molding material for accelerating the hardening process thereof by periodically changing from the supply of hot gases into the mold to a discharge of these hot gases from the mold together with the vapors and gases which are formed by heating the molding material. In such operations it has, however, been found that in the areas adjacent to the vent holes where the surface of the molded article does not engage with the surface of the final mold, the surface of the molded article swells up and grows into the vent holes so that projections are formed on this surface which have a size in accordance with that of the vent holes. Furthermore, it has been found that, when this method is applied, particles will be torn out of the surface of the blank before it is hardened which will then pass into the channels of the mold through which the gases and vapors are to be conducted away from the vent holes and the additional hot gases may be conducted to the inside of the mold in the manner as above described. These channels in the mold which are very inaccessible and very hard to clean will thus be clogged. If the molded articles have a larger wall thickness, it has further been found that the gases or vapors which are liberated at the inside of the article cannot pass sufficiently through the outer parts of the material which have already started to harden, so that the gases or vapors will not be sufficiently discharged through the vent holes.

In order to overcome these disadvantages, the vent channels have heretofore been provided with distributing parts which, when the final mold is being closed, are pressed into the blank and then projected into the molding material thereof. The openings of the distributing parts which are then located at the inside of the blank are intended to discharge the liberated gases and vapors from the inside of the blank and to facilitate the supply of heated gases to the inside of the blank in order to accelerate the heating thereof. However, even if these distributing parts or nozzles are of a thin spike-like or conical shape, they will leave holes in the finished molded article. It has especially been found to be of disadvantage that the narrow openings and channels of the distributing parts are quickly clogged up by particles of the molding material which, however, usually does not become apparent until damages on the mold of the type as above described are noticed.

It is the object of the present invention to overcome these disadvantages which occur in the production of molded articles as hitherto practiced. The present invention is based upon a recognition of the fact that, when the molding material is being compressed to form a blank, it is possible to press recesses therein through which, when the blank is thereafter compressed in the final mold, the liberated gases or vapors may be very easily and properly discharged. It has been found that the wals of these recesses—probably due to the stronger compression of the molding material at these points—have such a solidity that no particles of the molding material will be separated therefrom which might cause the channels of the final mold to be clogged. It has further been found that it is possible in this manner to avoid distributing parts with small openings and channels and to employ a mold which is provided with ordinary vent holes as previously mentioned. It has further been found that by this procedure it is not only possible to prevent the outer surface of the blank from growing into the vent holes and thus to prevent the formation of projections on the surfaces of the finished article, but that these recesses will also be pressed together in the final mold to such an extent that the finished article will have a perfectly plane surface. Although these recesses are pressed together during the molding process in the final mold, the structure of the molded article will remain so porous in this area that the liberated gases and vapors will be properly discharged during the molding process from the inside of the molded body and hot gases may also be conducted into the molded body in the manner as previously described. The vent holes and channels will therefore not be clogged, holes in the finished article as well as projections on the surfaces thereof will be avoided, the liberated or additionally injected gases or vapors will be sufficiently discharged, and the venting of the molded part will be accomplished in an extremely simple and perfect manner.

The features of the invention will hereafter be described with reference to the drawings which illustrate a preferred embodiment of the invention and in which:

FIGURE 3 shows a cross section of a final mold; while

Figure 1:
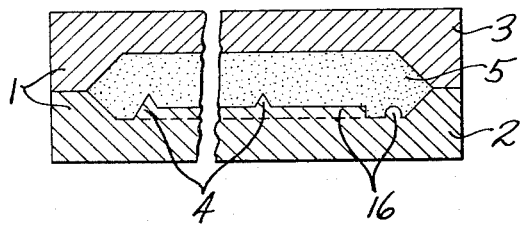
FIGURE 1 shows a cross section of a preliminary mold which is taken along the line I—I of FIGURE 2.

The preliminary mold 1 (FIGURES 1 and 2) which consists of a lower part 2 and an upper part 3 is provided with a plurality of projections 4 at different points of at least one of its molding surfaces. In the particular mold as illustrated, these projections are provided on the molding surface of the lower part 2 of the mold. When the preliminary mold 1 is being closed, that is, when the molding material 5 is being precompressed to form a blank 6, recesses are pressed into at least one side thereof.

The blank 6 (FIGURE 3) which is thus provided with a plurality of pressed-in recesses 7 at different points of its surface on at least one side thereof is then inserted together with a covering layer 8 into a final mold 9 which consists of a lower part 10 and an upper part 11. The molding surface of the lower part 10 of this mold is provided with vent holes 12 which are located within the plane of the molding surface, i.e., their upper edges are level with the molding surface. These vent holes 12 communicate with a venting channel 13 through which not only the gases and vapors which are formed within the blank 6 may be discharged, but hot gases may also be conducted into the blank 6. The final mold 9 serves for molding the blank 6 into the finished product 14 (FIGURE 4), for example in the form of a table plate, to which at the same time the covering layer 8 is secured.

The projections 4 of the preliminary mold 1 are located in such positions that the recesses 7 which are pressed into the blank 6 will communicate in the final mold 9 through the covering layer 8 with the vent holes 12. The projections 4 are made of such a height or the recess 7 of such a depth and cross-sectional size, and they are provided in such a number and at such a ditsance from each other that during the molding process in the final mold 9 the gas and vapors which are formed can be discharged even from the center of the blank 6 (FIGURE 3) and the recess 7 will be closed to such an extent that the molded part 14 will be provided with a level surface (FIGURE 4) without holes or projections at the points where the recesses 7 or the vent holes 12 were formerly located.

The projections 4 and accordingly the recesses 7 are preferably made of a conical shape, for example, in the shape of a pyramid or a cone. This permits the walls of the recesses 7 in the preliminary mold 1 to be so firmly compressed that in the final mold 9 no particles of the molding material will separate from the blank 6 which might enter into and clog the vent holes 12. On the other hand, if the recesses 7 are made of such a shape, they may be very uniformly and reliably pressed together.

Figure 3:
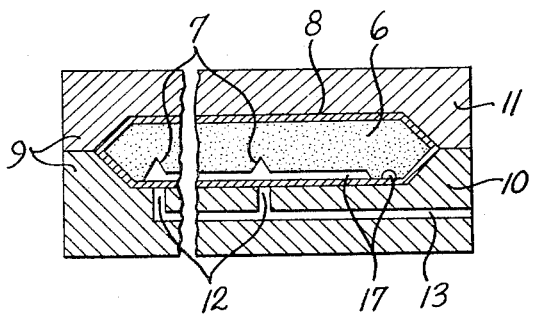
Figure 4:
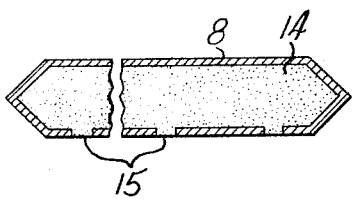
FIGURE 4 shows a cross section of the finished molded product.

In FIGURE 3, the covering layer consists of a wood veneer which is saturated with synthetic resin. Such covering layers and similar porous layers are sufficiently permeable to gases so that the recesses 7 may communicate through the covering layer with the vent holes 12. FIGURE 4, on the other hand, shows a covering layer which consists of plastic-coated paper which is usually impermeable to gases to such an extent that it has to be provided at the points of the vent holes 12 with holes 15 (FIGURE 4). These holes may be punched out, for example, when the covering layer is cut to size or they may be poked-in when the covering layer is being applied upon the blank.

Figure 2:
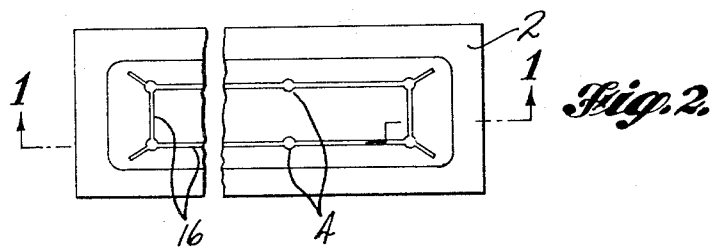
FIGURE 2 shows a top view of the lower part of the preliminary mold according to FIGURE 1.

According to another feature of the invention, the projections 4 are connected with each other by projecting webs 16 on the molding surface of the preliminary mold 1 (FIGURES 1 and 2). During the preliminary molding process, these webs 16 are pressed into the bank so as to form grooves 17 therein which connect the recesses 7 with each other (FIGURE 3). This not only insures a better venting of the blank 6 in the final mold 9 but also if desired, a better insertion of hot gases into the blank. The webs 16 and accordingly also the grooves 17 are preferably made of an arcuate or triangular cross section.

While the grooves 17 are covered up by the covering layer 8 and, if a permeable covering layer is employed, those points where the recesses 7 of the blank 6 are located are also covered up in the manner as above described and are therefore invisible, the molding material will be visible through the holes 15 of the covering layer 8 if the latter is impermeable to gases. The recesses 7 are therefore provided in a surface of the blank 6 which will not be visible in the subsequent use of the molded part 14, for example, in the lower side of a table plate.

I claim:
1. A method of producing molded articles from a molding material formed of comminuted wood and a binder, comprising: forming said molding material into a blank by compression; forming recesses into the blank in at least one side thereof; compressing said blank under heat and pressure to fully cure the same while venting gases through said recesses.

2. The method according to claim 1 wherein said recesses are conical.

3. The method according to claim 1 together with the step of forming grooves in said blank interconnecting said recesses with each other.

4. A method according to claim 3 wherein said grooves are circular in cross section.

5. The method according to claim 1 wherein the material defining said recesses expands to fill said recesses during the compression of said blank under heat and pressure.

6. The method according to claims 1, 2, 3, 4, 5, 7 or 8 wherein said blank is enveloped with an overlay material and said overlay material is provided with openings in communication with said recesses.

7. A method of producing molded articles from a molding material formed of comminuted wood and a binder, comprising: placing said material in a die; compressing said material into a blank having recesses in at least one side; placing said blank into a second die, said die having vent holes aligned with said blank recesses; and compressing said blank under heat and pressure to fully cure the blank while venting gases through said recesses and said vent holes.

8. The process of claim 7 wherein the material defining said recesses expands to fill said recesses during the compression of said blank under heat and pressure.

9. The method according to claims 1, 2, 3, 4, 5, 7 or 8 wherein at least one side of said blank is covered with an overlay material.

References Cited

UNITED STATES PATENTS

| 3,028,284 | 4/1962 | Reeves | 264—294 |
| 3,015,843 | 1/1962 | Gora | 264—294 |

FOREIGN PATENTS

| 713,350 | 8/1954 | Great Britain. |

ROBERT F. WHITE, *Primary Examiner.*

J. R. HALL, *Assistant Examiner.*

U.S. Cl. X.R.

264—119, 120, 294